(12) United States Patent
Dietrich et al.

(10) Patent No.: US 7,276,223 B2
(45) Date of Patent: Oct. 2, 2007

(54) METHOD AND DEVICE FOR CHEMICAL REACTION BETWEEN A GAS AND AT LEAST ONE COMPOUND IN SOLUTION CARRIED OUT IN THE PRESENCE OF A SOLID CATALYST

(75) Inventors: Marc Dietrich, Auffargis (FR); Jose Luis Hernandez, Sabinanigo (ES)

(73) Assignee: Technip France (FR)

(*) Notice: Subject to any disclaimer, the term of this patent is extended or adjusted under 35 U.S.C. 154(b) by 471 days.

(21) Appl. No.: 10/497,771

(22) PCT Filed: Dec. 3, 2002

(86) PCT No.: PCT/FR02/04159

§ 371 (c)(1),
(2), (4) Date: Jun. 4, 2004

(87) PCT Pub. No.: WO03/047741

PCT Pub. Date: Jun. 12, 2003

(65) Prior Publication Data

US 2005/0047992 A1 Mar. 3, 2005

(30) Foreign Application Priority Data

Dec. 4, 2001 (FR) .................. 01 15660

(51) Int. Cl.
*C01B 15/023* (2006.01)
*B01J 19/18* (2006.01)

(52) U.S. Cl. ............... 423/588; 210/333.01; 210/333.1; 422/224; 422/225; 423/659

(58) Field of Classification Search ............ 210/333.1, 210/333.01; 423/588, 589, 590, 659; 422/224, 422/225
See application file for complete search history.

(56) References Cited

U.S. PATENT DOCUMENTS

| | | | |
|---|---|---|---|
| 3,423,176 A | | 1/1969 | Kabisch et al. |
| 4,258,025 A | * | 3/1981 | Copelin ................ 423/588 |
| 4,374,820 A | * | 2/1983 | Guenter ................ 423/588 |
| 4,428,923 A | * | 1/1984 | Kunkel et al. ........... 423/588 |
| 4,552,748 A | * | 11/1985 | Berglin et al. .......... 423/588 |
| 4,836,936 A | * | 6/1989 | Schewitz .............. 210/791 |
| 5,063,043 A | * | 11/1991 | Bengtsson ............. 423/588 |
| 5,217,629 A | * | 6/1993 | Makiniemi et al. ...... 210/797 |

(Continued)

FOREIGN PATENT DOCUMENTS

WO   WO 01 68519   9/2001

OTHER PUBLICATIONS

International Search Report dated Apr. 9, 2003.

*Primary Examiner*—Wayne Langel
(74) *Attorney, Agent, or Firm*—Ostrolenk, Faber, Gerb & Soffen, LLP

(57) ABSTRACT

A gas/liquid reaction with a liquid containing at least one chemical compound in solution which can react with a gas in the presence of a solid catalyst maintained in suspension in the liquid, the reaction being carried out with separation (recovery) of said solid catalyst by filtering. Recirculating a fraction of the reacted solution without involving any additional pump or ejector, wherein the recirculated fraction provides for a primary filter for reacted solution being tangentially skimmed over.

10 Claims, 1 Drawing Sheet

U.S. PATENT DOCUMENTS 5,348,657 A * 9/1994 Eickhoff et al. ............ 210/636
5,534,149 A * 7/1996 Birkenbeil et al. ......... 210/636
5,772,977 A * 6/1998 Jenkins et al. .............. 426/588
6,126,914 A * 10/2000 Ogasawara et al. ......... 423/588
6,419,892 B1 * 7/2002 Schutte et al. .............. 423/588
6,799,687 B1 * 10/2004 Schön ........................ 210/411

* cited by examiner

METHOD AND DEVICE FOR CHEMICAL REACTION BETWEEN A GAS AND AT LEAST ONE COMPOUND IN SOLUTION CARRIED OUT IN THE PRESENCE OF A SOLID CATALYST

BACKGROUND OF THE INVENTION

The object of the present invention is:

a method for carrying out a chemical reaction between a gas and at least one compound in solution, whereby the method is carried out continuously in a stirred reactor in the presence of a solid catalyst maintained, in a dispersed state, in suspension within the solution containing said compound; said method including the separation of said catalyst from said reacted solution;

a device suitable for carrying out said method.

The present invention has, more particularly, been developed, with respect to the production of hydrogen peroxide ($H_2O_2$) using the anthraquinone method, for the catalytic hydrogenation of the working solution. Its field of application is however in no way limited thereto. Those skilled in the art will readily understand from the following that the field of application of the invention relates to any gas/liquid (G/L) reaction, liquid (L) containing, in solution, at least one chemical compound which can react with gas (G) in the presence of a solid catalyst which is held in suspension in said liquid (L).

According to the prior art, the execution of gas/liquid (GIL) reaction methods in the presence of a solid catalyst has been described; said solid catalyst being fixed (referred to as a fixed bed catalyst) or dispersed, in suspension within said liquid. In this second case, the problem of separating said catalyst from said reacted liquid arises. Such separation can be carried out using hydrocyclones. This is notably illustrated in application WO 98/282 25. Such separation can also be based on filtering operations.

The invention relates more precisely to gas/liquid (G/L) reactions, liquid (L) containing, in solution, at least one chemical compound, which can react with gas (G), in the presence of a solid catalyst maintained in suspension in said liquid (L), said reaction methods being carried out with separation (recovery) of said solid catalyst by filtering.

To facilitate, on the one hand, the disclosure below of the present invention, as regards the aspects of its method and device, -and on the other hand, the understanding of said invention, it is proposed, with reference to appended FIG. 1, that the prior art closest to the invention, as disclosed in general terms above, now be described in detail. An improvement to this prior art is proposed according to the invention.

DESCRIPTION OF A PRIOR ART EMBODIMENT

Figure 1:
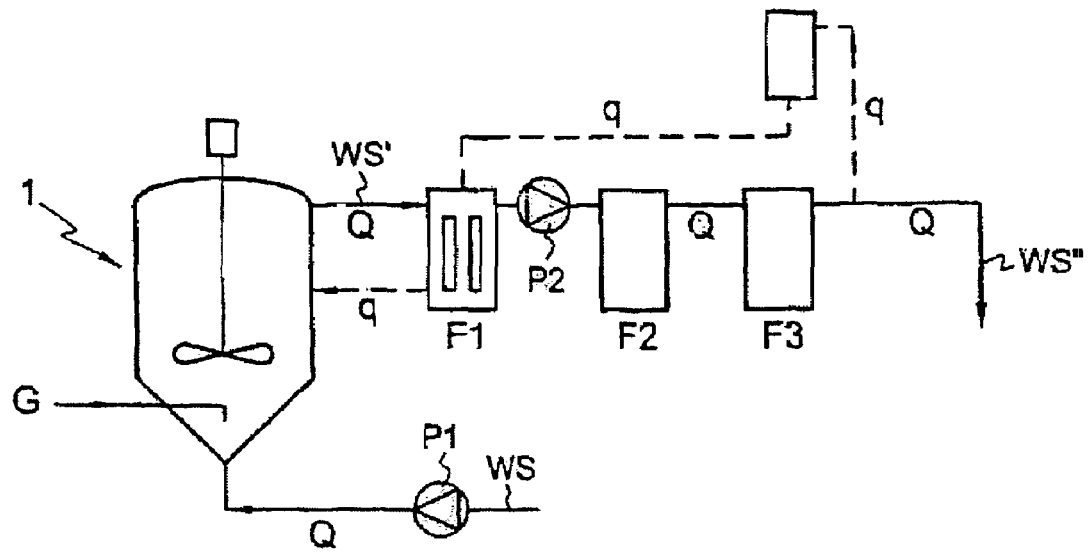
FIG. 1 illustrates a prior art embodiment closest to the invention.

According to said prior art, a solution WS (containing at least one compound which can react with gas G used) is treated continuously in reactor 1 with a gas G in the presence of a solid catalyst. Said solution WS is circulated at flow Q by pumps P1 and P2.

The treatment in question can indeed consist in hydrogenating ($G=H_2$) the working solution (at least one derivative of the anthraquinone dissolved in a complex mixture of organic solvents) which is used for the production of hydrogen peroxide ($H_2O_2$) in an anthraquinone cyclic method; said hydrogenation is carried out in the presence of a palladium-based catalyst which is supported on aluminium or aluminosilicate grains.

Solution WS is efficiently treated in stirred reactor 1 within which solid catalyst and reactive gas (G) are dispersed and maintained in suspension.

When exiting reactor 1, the catalyst is separated from treated solution WS' using a series of filters, including in succession:

at least one primary filter F1 generally of the type having a carbon or sintered metal candle (coarse filter with a porosity adapted to the porosity of the catalyst grains to be retained, for example a porosity of approximately 5 µm). In the advantageous variation shown, two such primary filters F1, mounted in parallel, are used;

at least one secondary filter generally of the cartridge filter type with a finer porosity (for example, approximately 0.5 µm), for stopping finer particles which have inexorably been generated as a result of the abrasion of the catalyst grains, as a result of the considerable agitation which is necessary in the reactor. In the advantageous variation shown, two such secondary filters, F2 and F3, mounted in series, are used.

The total flow Q of the solution entering reactor 1 in order to be treated is sent towards and passes through said filters F1, F2 and F3. Said flow Q effectively passes through single operational filter F1 (single filter F1 used or single operational filter F1 of a set of at least two filters mounted in parallel) or is divided between at least two operational filters F1 of such a set of filters. In the latter case, it is considered that flow Q passes through said operational filters which are considered as a whole.

Primary filters F1 are sequentially washed in a counter-current direction to prevent pores thereof from becoming blocked and to return the retained catalyst grains into reactor 1. This sequential washing involves a flow q taken, according to the variation shown, from flow Q of treated and filtered solution WS".

In addition to sequential washing, said primary filters F1 must regularly (once every three weeks as regards $H_2O_2$ production) undergo chemical washing (acid and/or basic) in order to remain clean.

Said primary filters F1 are largely stressed insofar as, on the whole, all of flow Q of treated solution WS' passes therethrough and the chemical washes are relatively aggressive treatments. They must be changed frequently.

The same applies to secondary filters F2 and F3. In fact, insofar as the effectiveness of the reactor is linked to the stirring force inside it, the abrasion of the grains of the catalyst used is relatively large.

Carrying out this method of the prior art leads to technical problems, notably the four given below:

the solid catalyst used, carried by flow Q, tends to collect on the primary filters. Said thus collected catalyst is no longer active in the reactor and is responsible for a head loss that is detrimental for maintaining said flow Q;

the chemical cleaning and the replacement of the candles in the primary filters are costly operations;

the replacement of the cartridges in the secondary filters is also a costly operation;

in view of the relation between flows q and Q, each counter-current wash upsets the operation of the reactor as a result of solution WS" and catalyst being returned into said reactor.

DESCRIPTION OF A PREFERRED EMBODIMENT

The invention has been developed, in relation to the foregoing with reference to said FIG. 1, in order to overcome said technical problems.

According to its first object, said invention therefore relates to a method for causing a chemical reaction between a gas and at least one compound in solution, the method being carried out continuously in a stirred reactor in the presence of a solid catalyst maintained, in a dispersed state, in suspension within the solution containing said compound. Typically, the method comprises:

supplying the reactor, at its bottom portion, with said solution to be reacted and with said gas;

bringing into contact, inside said reactor, said solution, said gas and said catalyst for the purposes of carrying out said chemical reaction;

recovering, at the top portion of said reactor, the reacted solution;

filtering said solution by passing it successively through at least one primary filter and at least one secondary filter;

recovering the reacted solution which is thus rid of said catalyst;

sequentially backwashing said primary filter(s) with a pulsed flow taken from said filtered, reacted solution and/or from the supply solution to be reacted; said backwashing being designed to return the catalyst retained on said primary filter(s) into said reactor.

These successive stages of the method of the invention are the same as in the prior art as schematically shown in FIG. 1.

Characteristically, said method of the invention further comprises the recirculation of a fraction of the reacted solution towards the bottom portion of said reactor, at a flow which is greater than the flow for supplying said reactor with the solution to be reacted; said recirculation being provided by sufficient stirring inside the reactor and said fraction of the reacted solution being redirected, for said recirculation, at said primary filter(s) and thus providing for tangential skimming over said primary filter(s).

Characteristically, according to the method of the invention, tangential skimming over said primary filter(s) is provided by a large flow of reacted solution recirculated at the bottom portion of the reactor; the stirring operation itself inside said reactor providing for said recirculation with a large flow.

In a non-limiting manner, it is specified at this point that this recirculation flow of the reacted solution is generally 3 to 10 times greater than the flow for supplying the reactor with the solution to be reacted. It is advantageously 5 to 10 times greater than said supply flow.

The key point of the method of the invention as it is carried out is the stirring operation inside the reactor. Said stirring is typically responsible for the extent of gas/liquid/catalyst contact. Furthermore, it must provide, in a more original manner, for the expected pumping effect (the recirculation of a fraction of the reacted solution).

According to an optimised manner of carrying out the method of the invention, said stirring must provide for:

the dispersion of the gas and the catalyst within the solution (optimised dispersion for optimisation of the above-mentioned contact);

the expected pumping effect (for recirculation); and the internal recirculation (inside the reactor) of the solution.

In fact, it is quite appropriate that the dwell time of said solution inside said reactor is sufficient for the gas/liquid reaction to take place correctly.

In view of the above, the person skilled in the art has already understood the entire significance of the method of the invention. Its embodiment offers a number of advantages. Notably:

a) there is a considerable increase in the reactor supply flow—it now consists in both the flow for supplying the solution to be reacted and the recycled solution flow (generally 3 to 10 times greater than said supply flow)— the disruptive effect of sequentially backwashing the primary filter(s) is considerably reduced or even eliminated;

b) mixed filtering carried out at said primary filter(s). A flow of treated solution corresponding to the reactor supply flow passes through the filter(s) and a larger flow of treated solution skims over the filter(s). This skimming minimises any accumulation of catalyst grains and fines, continuously cleans said filter(s) and recirculates said grains and fines towards the reactor. Thus, the catalyst concentration inside the reactor is optimised; the life span of the primary and secondary filter(s) is considerably increased (the frequency of chemically washing the candles of the primary filters is largely decreased as is the frequency of changing the cartridges of the secondary filters). As regards the hydrogenation of the working solution of an anthraquinone cyclic method for producing $H_2O_2$, an annual change and chemical wash have proved to be sufficient; the problem of the above-mentioned head loss (as a result of the treated solution passing through the collected catalyst) no longer exists;

c) in view of the recirculation of a fraction of the reacted solution, the reaction carried out inside the reactor can be controlled more easily; notably with regard to the formation of-by-products;

d) it is possible to optimise stirring inside the reactor to provide for a high level of distribution of the various liquid, solid, and gas components while limiting the abrasion of the catalyst;

e) with reference to points b) to d) above, catalyst consumption is reduced (by comparison to the consumption in a method of the type schematically shown in FIG. 1).

The method of the invention is particularly suitable for carrying out hydrogenation. In such contexts, the gas used consists of hydrogen or, in any case, contains hydrogen; the solution used contains at least one compound which can react with said hydrogen.

The method of the invention is particularly suitable for the hydrogenation of at least one derivative of anthraquinone in solution in the working solution as regards the preparation of hydrogen peroxide ($H_2O_2$). This is notably specified in applications WO98/28225 and EP016 622. In said context, the embodiment of the invention has enabled the applicant to obtain extremely interesting results. Depending on the composition of the working solution, she obtained hydrogenation levels which were as high as 10 g/l to 15 g/l (g of $H_2O_2$/liter of working solution), while limiting the formation of by-products.

There now follows the description, in general terms, of the second object of the present invention, namely a device which is suitable for carrying out the method described above (first object of said invention).

Said device typically comprises:

a reactor equipped with stirring means, solution supply means, gas supply means and means for delivering the reacted solution; said solution and gas supply means being arranged at the bottom portion of said reactor whereas said means for delivering the reacted solution are arranged at the top portion;

a filtering assembly mounted, at the outlet of said reactor, on said means for delivering the reacted solution and including at least one primary filter (generally, a set of at least two primary filters mounted in parallel such that it is possible to pass from one filter to another filter without interrupting the process) and at least one secondary filter (generally several secondary filters mounted in series);

means for carrying out sequential backwashing of said primary filter(s) with a pulsed flow q taken downstream of said filtering assembly from the filtered reacted solution and/or upstream of said reactor from the solution to be reacted.

In that respect, the device of the invention is of the prior art type, such as schematically shown in FIG. 1.

Characteristically, said device of the invention further comprises means for recirculating a flow of reacted solution, with tangential skimming over the primary filter(s), towards the bottom of said reactor and the stirring means of said reactor provide, themselves, for said recirculation.

Said means consist of an adequate circuit which successively provides for:

a fraction of the reacted solution being redirected at the top outlet of the reactor;

said redirected fraction tangentially skimming over operational primary filter(s);

recirculating said redirected fraction at the bottom portion of the reactor.

This fraction can be reintroduced into said reactor, independently, or otherwise, of said reactor being supplied with the solution to be reacted. According to an advantageous variation, a mixture of said recirculated fraction and said solution to be reacted is supplied in a single operation at the bottom portion of the reactor; said mixture having been formed upstream.

The stirring means in the reactor, which can provide for said stirring and recirculation of the redirected fraction, can also advantageously provide for internal recirculation. They consist advantageously of a multi-stage stirrer (generally with at least three stages).

With respect to an optimised alternative embodiment, said stirring means comprise:

a dispersion device, which operates in the bottom portion of the reactor;

a middle stage, which can provide for internal recirculation inside the reactor and help pump the reacted solution towards the primary filter(s);

an upper stage, which can ensure pumping of said reacted solution towards said primary filter(s).

Said dispersion device provides for a high level of dispersion of the catalyst and the gas within the solution containing the reagent(s) in solution.

Said middle stage (another device) provides for some pumping but above all for internal recirculation of the reaction mixture in the reactor (it allows the dwell time of said mixture in said reactor to be increased).

Said upper stage (another device) provides for pumping the reacted solution towards the primary filter(s). The flow provided must be large so as to constantly recirculate the catalyst towards the bottom of the reactor.

According to an alternative embodiment, for the purposes specified above, said middle and upper levels include blades which are inclined upwards and downwards respectively.

The device of the invention as described above is advantageously arranged in a hydrogen peroxide production loop, using the anthraquinone cyclic method, at the reactor for hydrogenating the working solution.

It is now proposed that the invention be reconsidered, as regards two aspects relating to method and device, with reference to the appended figures.

The solution to be reacted, WS, is supplied at a flow Q using pump P1. It is introduced into the bottom of the reactor after having been mixed with a fraction of the reacted solution WS', this fraction being recirculated at a flow Q'. It has been seen that advantageously $Q' \geqq 3\ Q$.

Furthermore, the mixture sequentially contains flow q of treated and filtered solution WS". This flow q was used to sequentially wash primary filter(s) F1.

Said mixture is made to react in the bottom portion of reactor 1 with gas G.

Stirring means 2 of said reactor 1 are of the optimum type specified above. They include a lower stage or dispersion device 2', a middle stage 2" which principally provides for recirculation of the solution in reactor 1 and an upper stage 2''' which principally provides for pumping reacted solution WS'.

It can be considered, schematically, that pump P1 provides for the circulation of flow Q of solution WS whereas upper stage 2''' of stirring means 2 provides, principally by itself, for the loop circulation of flow Q' of solution WS'. A second pump P2 is no longer needed according to FIG. 1.

Mixed filtering is carried out at primary filters F1. Flow Q of solution WS' passes through said filters F1 while flow Q' of said solution WS' tangentially skims over said filters F1. Said flow Q of solution WS' then passes successively through secondary filters F2 and F3. Flow q is taken from the filtered, reacted solution in order to carry out sequential counter-current washing of filters F1. According to another variation, said flow q could have been taken from flow Q of supplying solution WS to be reacted (before its mixing with the recirculated solution).

The amount of catalyst carried beyond primary filters F1 is minimised.

It is proposed, finally, that the invention be illustrated by the following example.

Figure 2:
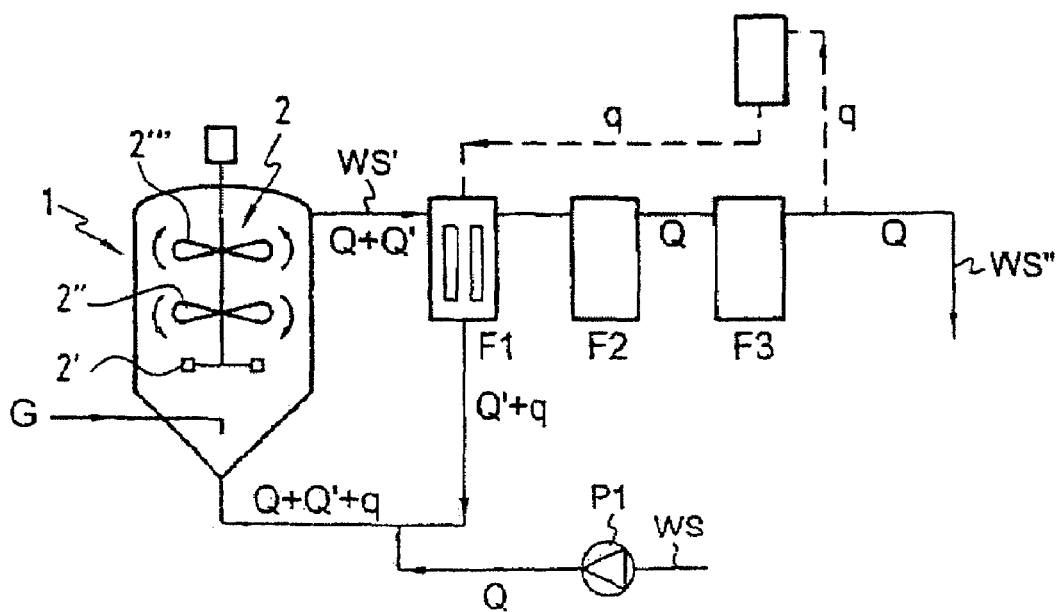
FIG. 2 illustrates a preferred variation of the prior art, but designed for carrying out the invention. It is considered in conjunction with said FIG. 1.

Said invention has been carried out, as illustrated in FIG. 2, during the catalytic hydrogenation ($G=H_2$, catalyst=supported Pd) of a working solution (WS) used for the production of hydrogen peroxide by the anthraquinone cyclic method. Said production was carried out at pilot stage with a 170-liter reactor.

Said reactor was equipped with a three-level stirrer, comprising from bottom to top:

a Rushton turbine with 6 fixed blades;

a turbine with 6 blades that can be variably inclined between 30° and 60°;

a "Sabre" propeller.

The flows were regulated as follows:

$Q_{WS}=0.8\ m^3/h$ $Q_{WS'}=3.5\ m^3/h$ $q_{WS''}=2.8\ m^3/h$, corresponding to pressure flushing of a volume of 8 l of liquid for 10 sec every 30 min.

It is under the above-specified conditions that the good results given above have been obtained:

a high degree of hydrogenation of 10 to 15 g/l;

annual chemical washing and replacement of the primary filters;

increase of the life span of the secondary filters.

The invention claimed is:

1. A method performed in a stirred reactor comprising a multi-stage stirrer for carrying out a chemical reaction between a gas and at least one compound in solution and in the presence of a solid catalyst maintained, in a dispersed state, in suspension within the solution containing said compound; said method comprising:

supplying said reactor, at its bottom portion, with said solution to be reacted and with said gas;

bringing into contact, inside said reactor, said solution, said gas and said catalyst for carrying out said chemical reaction;

recovering reacted solution at the top portion of said reactor;

filtering said solution by passing it successively through at least one primary filter and at least one secondary filter;

recovering filtered reacted solution which has been thus rid of said catalyst;

sequentially backwashing said at least one primary filter with a pulsed flow taken from at least one selected from the group consisting of said filtered reacted solution and the supply solution to be reacted; wherein said backwashing returns the catalyst retained on said at least one primary filter into said reactor recirculating a fraction of unfiltered reacted solution towards a bottom portion of said reactor, at a first flow of unfiltered reacted solution which is greater than a second flow for supplying said reactor with solution to be reacted; said recirculation being provided by the multi-stage stirrer inside said reactor and by said fraction of unfiltered reacted solution being redirected, for said recirculation, at said at least one primary filter and thus providing for tangentially skimming over said at least one primary filter.

2. Method according to claim 1, wherein said first flow for recirculating unfiltered reacted solution is 3 to 10 times greater than said second flow for supplying said reactor with solution to be reacted.

3. Method according to claim 1, wherein said multi-stage stirrer, inside said reactor is operable for:

dispersing the gas and the catalyst within said solution to be reacted;

generating a pumping effect for providing said recirculation;

an internal recirculation of said solution to be reacted.

4. Method according to claim 1, wherein said gas is hydrogen ($H_2$).

5. Method according to claim 1 operable for carrying out hydrogenation of at least one derivative of anthraquinone in the preparation of hydrogen peroxide ($H_2O_2$).

6. Method according to claim 1, wherein said recirculation is provided by the multi-stage stirrer without an additional pump.

7. A device which is suitable for carrying out the method according to claim 1, comprising:

a reactor having a top portion and a bottom portion and an outlet and comprising a multi-stage stirrer, a solution supply, a gas supply and a device for delivering reacted solution which has been reacted in the reactor; said solution supply and said gas supply are arranged at said bottom portion of said reactor, whereas said device for delivering reacted solution is arranged at said top portion;

a filtering assembly mounted at the outlet of said reactor, and on said device for delivering reacted solution said filtering assembly including at least one primary filter and at least one secondary filter that follows said primary filter;

a backwash device for carrying out sequential backwashing of said at least one primary filter with a pulsed flow, wherein said backwash device is operable to take its supply of liquid for backwash from at least one selected from the group consisting of downstream of said filtering assembly from filtered reacted solution and upstream of said reactor from solution to be reached; and a recirculating device for recirculating a flow of reacted solution, with tangential skimming over said at least one primary filter, towards said bottom of said reactor and said multi-stage stirrer of said reactor providing for said recirculation.

8. Device according to claim 7, wherein said stirrer comprises:

a dispersion device, which operates in said bottom portion of said reactor;

a middle stage operable to provide for internal recirculation inside said reactor and to help to pump reacted solution towards said at least one primary filter; and an upper stage, which pumps said reacted solution towards said at least one primary filter.

9. Device according to claim 8, wherein said middle stage and said upper stage include blades which are inclined downwards and upwards, respectively.

10. Device according to claim 7, arranged in a hydrogen peroxide production loop ($H_2O_2$).

* * * * *